UNITED STATES PATENT OFFICE.

BENJAMIN T. BROOKS, OF PITTSBURGH, PENNSYLVANIA, ASSIGNOR TO GULF REFINING COMPANY, OF PITTSBURGH, PENNSYLVANIA, A CORPORATION OF TEXAS.

MANUFACTURE OF ALUMINUM CHLORID.

1,165,065.   Specification of Letters Patent.   Patented Dec. 21, 1915.

No Drawing.   Application filed September 8, 1915.   Serial No. 49,604.

*To all whom it may concern:*

Be it known that I, BENJAMIN T. BROOKS, a citizen of the United States, residing at Pittsburgh, in the county of Allegheny and State of Pennsylvania, have invented certain new and useful Improvements in the Manufacture of Aluminum Chlorid, of which the following is a specification.

This invention relates to the manufacture of aluminum chlorid; and it comprises a method of producing aluminum chlorid wherein a current of chlorin is forcibly blown in or on a body of molten aluminum to produce aluminum chlorid while avoiding formation of a protective or shielding film or layer on such aluminum and the aluminum chlorid thus formed is condensed, the treatment of the molten aluminum with the forcible current of chlorin being advantageously in a vessel or crucible formed of or lined with resistant material such as pure graphite, silica or alumina; all as more fully hereinafter set forth and as claimed.

In the manufacture of anhydrous aluminum chlorid on the large scale the operation is somewhat difficult to conduct with economy and completeness while at the same time producing material of a high degree of purity. In the method which is generally used, bauxite or other form of alumina is mingled with carbon and exposed to the action of chlorin at a high temperature; the operation being usually in clay tubes or retorts. Aside from the impurities which are always present in bauxite, further impurities are contributed by the reaction vessel itself since chlorin attacks clay at a high temperature in the presence of carbon. There is also an escape of chlorin through the pores and cracks of the tube or retort while a large proportion of chlorin generally goes forward with the effluent gases and vapors, causing not only loss of chlorin but being apt to create a nuisance. As the reaction creates a large body of gas (mostly carbon monoxid) condensation of aluminum chlorid is attended with some difficulty and the condensate is apt to take up impurities from the gas. In operating with metallic aluminum, by bringing such aluminum into contact with chlorin a much cleaner product can be obtained, but this material also offers difficulties.

The metal should be at least red hot to permit free attack by the chlorin; and since the heat of reaction is very great, if it be attempted to work at any rapid rate the metal generally melts down. But as it melts down, it becomes covered with a pellicle or slag, possibly in part due to impurities but mostly due to oxidation. It is in practice not possible to keep all the gases and materials completely dry, nor is it possible to secure complete exclusion of air or oxygen; and in the presence of air or moisture, the aluminum becomes covered with a floating or adhering coating of oxid. This coating though thin is dense, impervious and coherent and prevents ready contact of the chlorin with the metal.

In chlorinating aluminum by chlorin gas in hot retorts or tubes of the usual materials it is therefore difficult to secure a good and clean reaction. Chlorin must be used in relatively large amount and unused chlorin goes forward and escapes with the aluminum chlorid even when using aluminum-charged tubes three or four feet long.

In the present invention, much more satisfactory results are obtained by a simple modification which comprises delivering the chlorin gas into contact with molten aluminum at a sufficiently great pressure to keep the surface brushed clear of floating oxids and impurities. It is however still better to deliver the chlorin under sufficient pressure to carry it down underneath the surface of the molten aluminum; bubbling it therethrough. With a rapid current of chlorin blown into the aluminum it is found as a matter of practice that all the chlorin is utilized; there is no waste of gas passing on unchanged and unused. In this action, for reasons already stated, the material of the retort or chamber is not a matter of indifference. In the operation there are the conjoint influences of molten aluminum, which is of course a powerful reducing agent, and that of chlorin. Impurities in the vessel are apt to be reduced by the aluminum and chlorinated by the chlorin and go forward to contaminate the aluminum chlorid formed. The best material to use for the container is pure graphite. It may be any of the modern synthetic graphites. Or the reaction vessel may be built up of silica bricks and thinly cemented at the joints with fire-clay. The cover may be of fire-clay and provided with silica or fire-clay inlet and outlet. The cover being removed from the influence of the molten aluminum, its composition is not so important. Instead of silica, alumina may be used. Some of the modern commercial forms of fused alumina are quite suitable.

The ordinary crucible mixtures of graphite and clay are much less suitable for the present purposes than the materials just stated since these mixtures rapidly disintegrate from the action of the chlorin and heat apart from the action of the aluminum itself. The graphite acts as a reducing material upon the clay and its components. Pure graphite and fused alumina are not readily affected by chlorin, by metallic aluminum or by aluminum chlorid; and the action upon silica is very little.

In forming the aluminum chlorid the reaction vessel may be heated to melt the aluminum and start the reaction; but the combination of the chlorin with the aluminum will itself afterward maintain the heat and keep the aluminum in a molten condition. The chlorin is best led down into the molten metal by a tube also composed of pure graphite silica or aluminum oxid (alundum.)

The action of the chlorin upon the molten aluminum in the manner described produces pure concentrated vapors of aluminum chlorid, containing substantially no chlorin or other gases; and these vapors are easily condensed. They may be condensed in condensing chambers of any ordinary material, such as fire-clay, iron, etc. A short length of water-cooled iron pipe gives a good condensation. The agitation of the molten metal by the blast of chlorin blown in keeps the surface clean. The temperature used may be advantageously about 700 to 900° C. Hydrochloric acid gas (HCl) may be used in the same way as chlorin.

What I claim is:—

1. The process of making aluminum chlorid which comprises forcibly projecting a stream of chlorin gas into contact with molten aluminum under pressure sufficient to keep such aluminum agitated.

2. The process of making aluminum chlorid which comprises establishing and maintaining a body of molten aluminum in a graphite vessel and projecting chlorin into contact with said aluminum at a pressure sufficiently great to keep such aluminum agitated.

3. The process of making aluminum chlorid which comprises passing a stream of chlorin gas under pressure into contact with a body of molten aluminum below the surface of such aluminum.

4. The process of making aluminum chlorid which comprises establishing and maintaining a body of molten aluminum in a graphite vessel and passing chlorin under pressure into such body of molten aluminum.

In testimony whereof, I affix my signature.

BENJAMIN T. BROOKS.